(12) United States Patent
Maher

(10) Patent No.: US 7,534,320 B2
(45) Date of Patent: May 19, 2009

(54) LAMINATION PRESS PAD

(75) Inventor: Lawrence J. Maher, Lake in the Hills, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 519 days.

(21) Appl. No.: 11/274,848

(22) Filed: Nov. 15, 2005

(65) Prior Publication Data

US 2007/0107838 A1 May 17, 2007

(51) Int. Cl.
*B32B 37/00* (2006.01)
(52) U.S. Cl. .................... 156/293; 156/303.1; 438/18; 257/728
(58) Field of Classification Search ............... 156/293, 156/303.1, 581, 583.3; 438/118, 119; 257/728
See application file for complete search history.

(56) References Cited

U.S. PATENT DOCUMENTS

| | | | |
|---|---|---|---|
| 5,877,554 A | 3/1999 | Murphy | |
| 5,927,589 A | 7/1999 | Yang | |
| 5,971,257 A | 10/1999 | Yang | |
| 6,020,635 A | 2/2000 | Murphy | |
| 6,261,492 B1 * | 7/2001 | Iovdalsky | 264/69 |
| 6,313,530 B1 | 11/2001 | Murphy | |
| 6,356,453 B1 * | 3/2002 | Juskey et al. | 361/760 |
| 6,426,878 B2 | 7/2002 | Tanioka et al. | |
| 6,709,890 B2 | 3/2004 | Ida et al. | |
| 2001/0001078 A1 | 5/2001 | Nakabayashi | |
| 2001/0014490 A1 | 8/2001 | Ida et al. | |
| 2003/0203521 A1 | 10/2003 | Kohno et al. | |
| 2003/0224146 A1 * | 12/2003 | Raidel et al. | 428/182 |
| 2004/0036165 A1 * | 2/2004 | Ammar | 257/723 |
| 2004/0192011 A1 | 9/2004 | Roesner | |

FOREIGN PATENT DOCUMENTS

| | | | | |
|---|---|---|---|---|
| JP | 56098016 A | * | 8/1981 |
| JP | 61208839 A | * | 9/1986 |
| JP | 62115731 A | * | 5/1987 |
| JP | 2001066207 A | * | 3/2001 |

* cited by examiner

*Primary Examiner*—John L Goff
(74) *Attorney, Agent, or Firm*—Stetina Brunda; Garred & Brucker

(57) ABSTRACT

A press pad for bonding substrates into a radio-frequency and/or intermediate-frequency module. The module has a plurality of channels, each of which has an adhesive film for bonding the substrate. The press pad has a pad body conformal to the substrate and pairs of lateral protrusions extending from central axes of opposing surfaces of the pad body. The protrusions are in the forms of semicircular bumps or fins extending perpendicular to the opposing surfaces. Therefore, the lateral extent of the press pad within the channel is minimized, such that the misalignment and inclination of the press pad is minimized. Further, the lateral protrusions are fabricated from material operative to resist lateral pressure, such that deformation of the press pad caused by lateral pressure is also prevented. Therefore, pressure gradient and pressure loss are prevented.

9 Claims, 4 Drawing Sheets

LAMINATION PRESS PAD

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

This invention relates in general to a lamination press pad, and more particularly, to a press pad that provides uniform pressure for bonding a substrate(s) into a radio frequency (RF) and/or intermediate frequency (IF) modules.

In the electronic manufacturing industry, an RF/IF module typically includes many electronic devices integrated into a single case to perform specific functions. These electronic devices utilize a variety of technologies from packaged devices to integrated circuits of substrates that will be populated with a plurality of components. As more and more sophisticated functions are desired for these IF/RF modules, more and more individual electronic devices are required and embedded into the case. Many of these modules require channelization to achieve signal isolation in the circuit. As the functional requirements increase so must the packaging density. Electronic devices shrink in size to accommodate more devices to increase the packaging density. Channels in the case also became narrower resulting in higher aspect ratio between the channel width and their depth or case sidewall height. This narrowing creates great difficulty for bonding the individual electronic devices into the channels.

BRIEF SUMMARY OF THE INVENTION

A method and a press pad are provided to resolve the difficulty of bonding the substrates into respective channels, particularly the channels with a high aspect ratio, of a case of a RF/IF module. Typically, these substrates are ceramic thin film. Other substrate technologies include ceramic thick film and printed circuit board. This method and press pad may be applied to other substrate technologies not listed herein. To bond the substrates into the respective channels of the case, an adhesive film is placed and positioned on the bottom surface of the case floor, including in the channels. The substrates are then placed on the adhesive film in the case. To obtain good wetting of the adhesive film to both the case and substrates, press pads are used to apply pressure uniformly across the substrates. While under pressure the adhesive film is cured using heat. Preferably, the width of the press pad conforms to the substrate outline, and the substrate is smaller than the width of the channel in the case. Therefore, the press pad can fit within the channel without direct contact with the sidewalls of the channel, so as to avoid the pressure loss caused by the friction between the pad and sidewall if the pad were to contact the sidewalls. However, as the width of press pad narrows to fit in the channel, the press pad becomes more flexible and often results in misalignment with the substrate due to lateral movement. When pressure is applied, this misalignment can cause pressure gradients across the substrate instead of uniform pressure. To avoid this misalignment and resulting pressure gradients, protrusions are formed on opposing edges of the press pad to align it in the channel. Therefore, when the press pad is moved in and out of the channel, the gap between the edges of the press pad and the channel is minimized, such that the lateral movement of the press pad such as slide or inclination is minimized.

Preferably, the press pads and the protrusions have a height higher than the depth of the channels, such that the user can easily place and remove the press pads in and out of the case and its channels. In one embodiment, the protrusions include a pair of semi-cylindrical bumps extending from center axes of the edges of the press pad wherever they are needed to restrict the lateral movement and aid in the alignment to the substrate. The protrusions can also be in the form of two symmetric fingers extending from the center axes of the opposing edges of the press pad. The protrusions are rigid enough to resist lateral pressure applied thereto, so as to avoid deformation caused by the lateral pressure.

After the substrates are bonded with the adhesive films in the case, components such as chips or other electronic components are glued or attached to the substrates.

BRIEF DESCRIPTION OF THE DRAWINGS

These as well as other features of the present invention will become more apparent upon reference to the drawings therein. The particulars shown herein are by way of example and for purposes of illustrative discussion of the embodiments of the present invention only and are presented in the cause of providing what is believed to be the most useful and readily understood description of the principles and conceptual aspects of the current invention. In this regard, no attempt is made to show the present invention in more detail than is necessary for the fundamental understanding of the present invention, the description taken with the drawings making apparent to those skilled in the art how the several forms of the present invention may be embodied in practice.

DETAILED DESCRIPTION OF THE INVENTION

Figure 1:
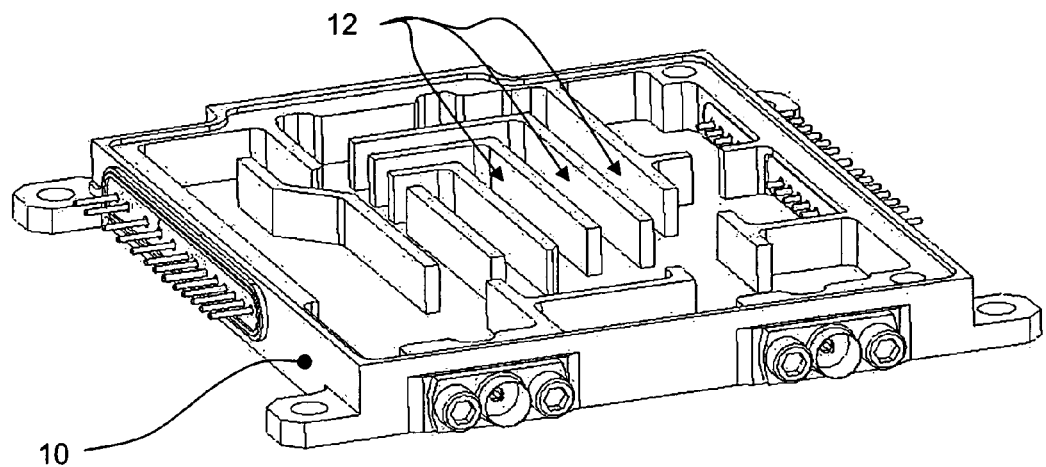
FIG. 1 shows an example case of a RF/IF module that includes some channels.
Figure 2:
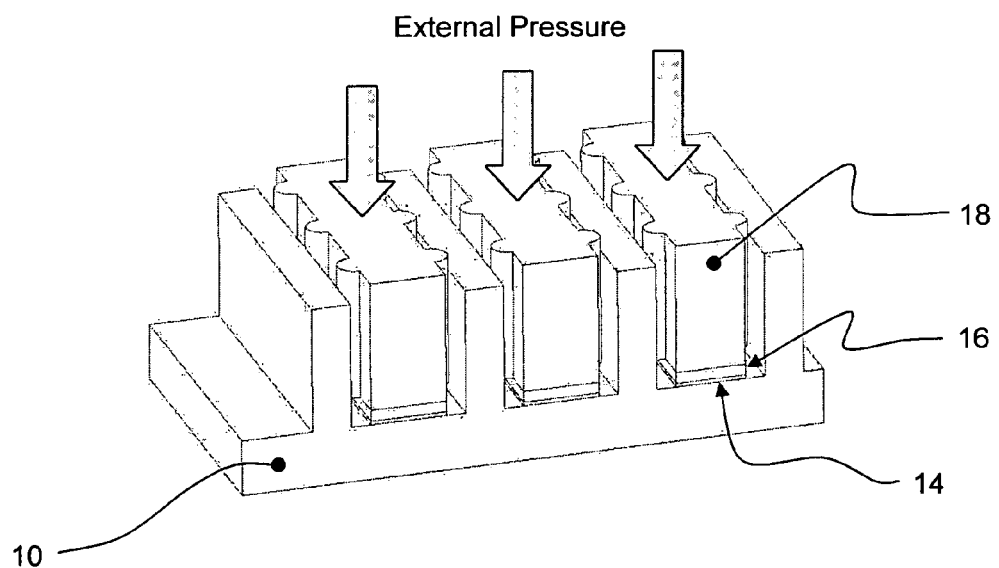
FIG. 2 shows a cross-sectional perspective view of the case.

As shown in FIG. 1, a RF and/or IF module that comprises a case 10 is provided. The case 10 includes several channels 12 for isolating a plurality of electronic devices therein. The case is preferably a metallic case, for example. The electronic devices are preferably in the form of integrated circuits, that is, each of the electronic devices includes a substrate 16 on which a plurality of electronic components is mounted. The substrates 16 are bonded to bottom surfaces of each channel 12. As shown in FIG. 2, an adhesive film 14 is placed on the bottom surface of the case floor including in the channels 12 for bonding the substrates 16 within the channels 12. The adhesive film 14 is a thin film fabricated from epoxy, for example.

Heat and pressure are two major processes to properly bond the substrates 16 with the adhesive films 14 in the respective channels 12. Heat is used to cure the adhesive films 14, while pressure promotes wetting of the surfaces of the adhesive films 14 on the case 10 and the substrates 16 during cure. In this embodiment, the press pads 18 are used to transfer external pressure to the interface between the substrates 16 and the adhesive films 14 and between the adhesive film 14 and case 10. The pressure sources may include weight, spring mechanisms, or a lamination source applied to the top surface of the pressure pads 18. Preferably, the press pads 18 are fabricated from polymer such as silicone, for example.

Figure 3:
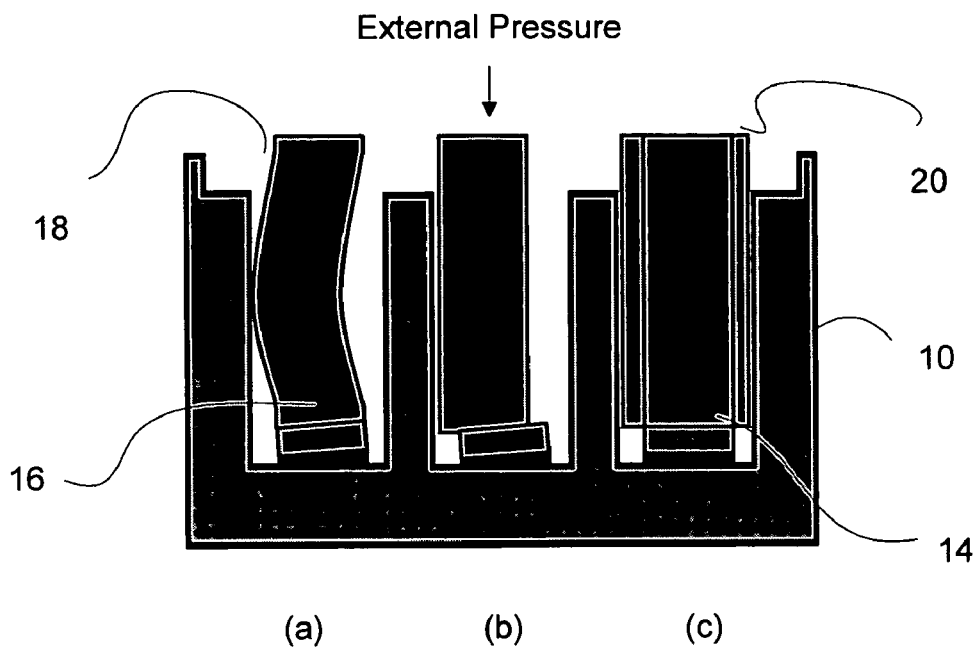
FIG. 3 shows cross-sectional views of the applications of press pads in various configurations.

To provide uniform pressure on the two aforementioned interfaces, the outline or size of the press pad 18 is preferably the same as the substrate 16 outlines. To allow the substrates 16 to be placed in the channels 12, the substrates 16 have a width smaller than the channel 12. Therefore, the width of the press pads 18 is also smaller than that of the channels 12 to result in a larger lateral extent or gap between the edges of the press pads 18 and the sidewalls of the case channels. When the press pads 18 are used to transfer external pressure to the interfaces, the larger lateral extent often results in misalignment between the press pads 18 and the substrates 16 as shown in FIG. 3b. When the external pressure is applied normal to the top surface of the press pads 18, inclination of the press pads 18 may occur. The misalignment and inclination of the press pads 18 cause the external pressure to be non-uniformly applied to the interface between the substrate 16, adhesive films 14, and case 10 interfaces, so as to create a pressure gradient across the interfaces. When the channels 12 become deeper, that is, have a higher aspect ratio, the press pads 18 have to be made taller and skinner. The taller or skinner configuration makes press pads 18 easily bent, flexed or deformed as shown in FIG. 3a. The inclination and deformation of press pads 18 both may cause a contact between the sidewalls of the channels 12 and the press pads 18. When the contact area is large, a significant portion of the external pressure is diverted into friction between the sidewalls and the press pads 18. The insufficient pressure often results in non-uniform pressure and poor wetting of the adhesive films 14 to the substrates 16 and case 10, such that the bond strength of between the adhesive films 14 and the substrates 16 is weakened or the grounding of the substrate is varied from the build intent.

Figure 4:
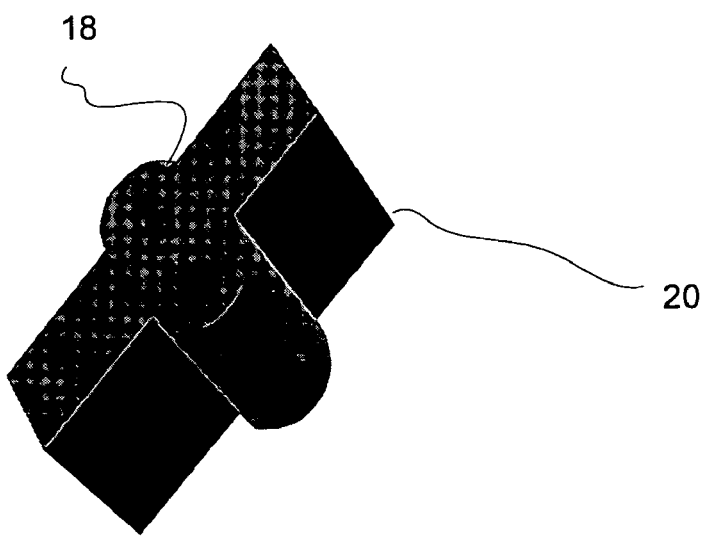
FIG. 4 shows a perceptive view of a press pad having a pair of protrusions.
Figure 5:
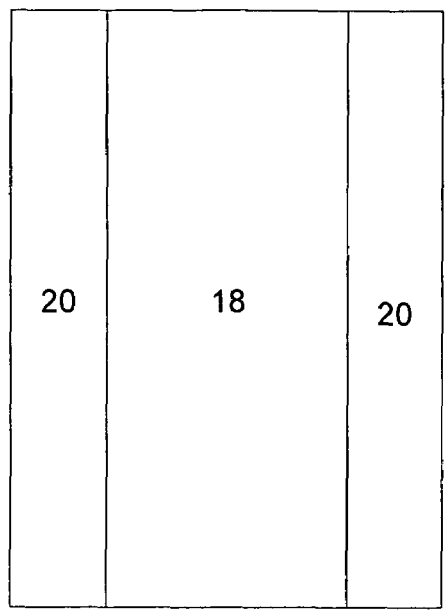
FIG. 5 shows a cross-section view of the press pad as shown in FIG. 4.
Figure 6:
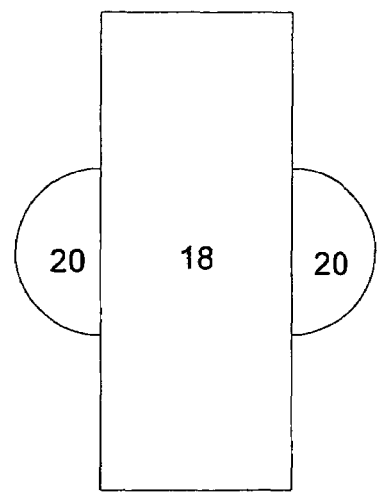
FIG. 6 shows a top view of the press pad as shown in FIG. 5.

To minimize the lateral extent of the press pads 18 which protrusions are in slidable engagement with an adjacent sidewall of the channel as the press pad vertically translates in the channel, thereby maintaining a lower abutting surface of the press pad parallel to the substrate within the channels 12, in this embodiment, a pair of symmetric protrusions 20 is formed on two opposing edges of the press pads 18. Many configurations can be applied for forming the protrusions 20. For example, as shown in FIGS. 4 to 6, the protrusions 20 are in the form of a pair of semi-circular bumps protruding from center axes of the opposing edges of the press pad 18. The maximum width of the press pad 18 is thus the width of the press pads 18 plus the radii of the protrusions 20. Therefore, when the press pad 18 is inserted into the channel 12, the gap between the press pads 18 and the sidewalls of the channels 12 is narrowed, and the possibility of misalignment and inclination is thus lowered. Further, as the protrusions 20 are formed with a semi-circular configuration, the periphery of each protrusion 20 only has a single line contact with the sidewall of the channels 12. Therefore, in this embodiment that the protrusions 20 extend from the bottom surface to the top surface of the press pad 18. It will be appreciated that each of the protrusions 20 may includes discrete protrusion segments along the center axes of the surfaces to further reduce the contact to the sidewalls of the channel 12.

Figure 7:
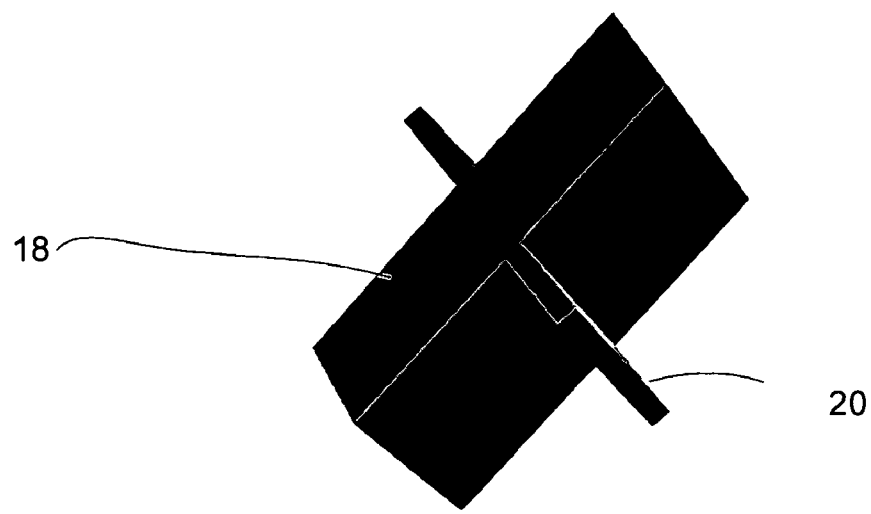
FIG. 7 shows a perspective view of another embodiment of a press pad having a pair of protrusions.
Figure 8:
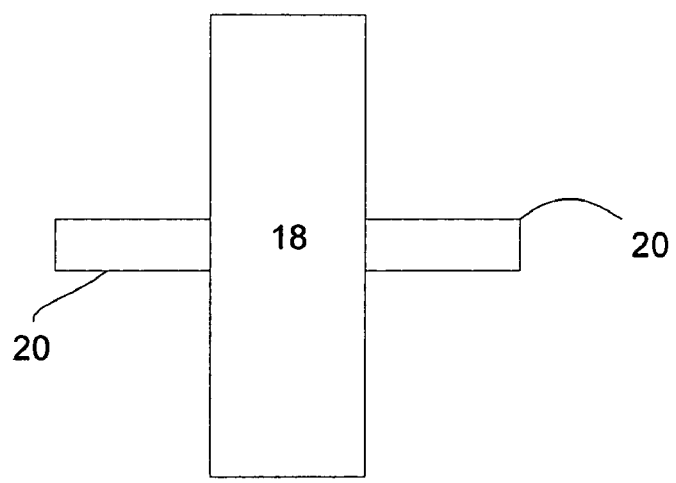
FIG. 8 shows a top view of the press pad as shown in FIG. 7.

FIGS. 7 and 8 show another embodiment of the protrusions 20. As shown, the protrusions 20 in the form of a pair of fins extend along a center axes of the opposing edges of the press pad 18. The total lateral width is thus the width of the press pad plus the length of both fins 20. Therefore, the gap between the press pad 18 with the fins 20 and the sidewall of the channel 12 is reduced, and the possibility of misalignment between the press pad 18 and the substrate 16 and inclination of the press pad 18 is reduced. Further, as the fins 20 are formed of material operative to resist lateral pressure, the press pad 18 is thus protected from being deformed by lateral pressure applied thereto. Further, the fins 20 are made with very thin thickness, such that when contact between the press pad 18 and the channel 12 sidewalls is unavoidable, friction is minimized by the very thin structure of the fins 20.

When the substrates 16 have been bonded with the adhesive films 14 by means of heat and external pressure transferred by the press pad 18 as described, electronic components can then be glued or attached to respective substrates 16 within the channels 12. Thereby, a high-performance RF and/or IF module can be obtained.

This disclosure provides exemplary embodiments of a lamination press pad. The scope of this disclosure is not limited by these exemplary embodiments. Numerous variations, whether explicitly provided for by the specification or implied by the specification, such as variations in shape, structure, dimension, type of material or manufacturing process may be implemented by one of skill in the art in view of this disclosure.

What is claimed is:

1. A method of bonding a substrate into a channel of a radio-frequency module, comprising:
   (a) placing an adhesive film on a bottom surface of the channel, the channel having at least two sidewalls;
   (b) placing a substrate on the adhesive film, the substrate having a height smaller than the depth of the channels;
   (c) inserting a press pad into the channel and over the substrate, the press pad including a lower abutting surface for abutting the substrate, and an elongated pad body having a pair of vertical protrusions extending laterally from the pad body on opposing sides thereof;
   (d) maintaining the vertical protrusions in slidable engagement with an adjacent sidewall of the channel as the press pad vertically translates in the channel thereby maintaining the lower abutting surface parallel to the substrate;
   (e) applying pressure to the press pad so that the lower abutting surface abuts the substrate thereby promoting the bonding between the substrate, the adhesive film, and the bottom surface of the channel; and
   (f) curing the adhesive film under pressure.

2. The system of claim 1, wherein step (e) further comprises applying force from a spring mechanism on a top surface of the press pad.

3. The method of claim 1, wherein step (e) further comprises applying a weight on a top surface of the press pad.

4. The method of claim 1, wherein step (e) further comprises applying a vacuum lamination source on a top surface of the press pad.

5. A method of fabricating a radio-frequency module, an intermediate-frequency module, or a radio- and intermediate-frequency comprising:
   (a) providing a case having a plurality of channels, each channel having at least two sidewalls;

(b) bonding a substrate into each of the channels, the substrate height being smaller than the depth of the channels, the bonding step further comprising:
  (b1) disposing an adhesive film on a bottom surface of each channel;
  (b2) placing the substrates on the adhesive films;
  (b3) inserting a press pad into the channel and over the substrate, the press pad including a lower abutting surface for abutting the substrate, and an elongated pad body having a pair of vertical protrusions extending laterally from the pad body on opposing sides thereof;
  (b4) maintaining the lateral protrusions in slidable engagement with an adjacent sidewall as the press pad vertically translates in the channel thereby maintaining the lower abutting surface parallel to the substrate;
  (b5) applying pressure to the press pad so that the lower abutting surface abuts the substrate thereby promoting the bonding between the substrate, the adhesive film, and bottom surface of the channel; and
  (b5) curing the adhesive film under pressure;
(c) gluing a plurality of electronic components on the respective substrates.

6. The method of claim 5, wherein the vertical protrusions are in the form of semi-circular bumps.

7. The method of claim 5, wherein the vertical protrusions are fins extending along central axes of opposing surfaces of the press pad.

8. The method of claim 5, wherein the vertical protrusions are fabricated from material operative to resist lateral pressure.

9. The method of claim 5, further comprising a step of integrally forming the pad body and the vertical protrusions.

* * * * *